United States Patent
Lee et al.

(10) Patent No.: US 11,125,173 B2
(45) Date of Patent: Sep. 21, 2021

(54) EXHAUST GAS PURIFICATION SYSTEM FOR VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Hyokyung Lee, Anyang-si (KR); Chang Hwan Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 101 days.

(21) Appl. No.: 16/550,732

(22) Filed: Aug. 26, 2019

(65) Prior Publication Data

US 2020/0271067 A1   Aug. 27, 2020

(30) Foreign Application Priority Data

Feb. 21, 2019   (KR) ........................ 10-2019-0020389

(51) Int. Cl.
*F02D 41/06* (2006.01)
*B01D 53/94* (2006.01)
(Continued)

(52) U.S. Cl.
CPC ......... *F02D 41/064* (2013.01); *B01D 53/945* (2013.01); *B01D 53/9422* (2013.01);
(Continued)

(58) Field of Classification Search
CPC .. F01N 11/00; F01N 13/0093; F01N 13/0097; F01N 2430/06; F01N 2550/02;
(Continued)

(56) References Cited

U.S. PATENT DOCUMENTS

2002/0189242 A1   12/2002   Farmer et al.
2004/0168431 A1*   9/2004   Goralski, Jr. ....... F02D 41/0275
                                                            60/286
(Continued)

FOREIGN PATENT DOCUMENTS

DE          102 25 599 A1      1/2003
DE       10 2004 029 202 A1    7/2005
EP           3 351 780 A1      7/2018

OTHER PUBLICATIONS

Extended European Search Report issued in corresponding European Patent Application No. 19192482.8 dated Jan. 31, 2020.

*Primary Examiner* — Anthony Ayala Delgado
(74) *Attorney, Agent, or Firm* — Morgan, Lewis & Bockius LLP

(57) ABSTRACT

An exhaust gas purification system for vehicle includes: a housing disposed on an exhaust pipe to receive a exhaust gas discharged from an engine and to exhaust the exhaust gas passed rearward; a front end catalyst disposed in the housing to purify the exhaust gas flowing into the housing through a front end of the housing; a rear end catalyst disposed in the housing to purify the exhaust gas passing through the front end catalyst before the exhaust gas flows out to a rear end of the housing; and a controller connected to the exhaust pipe at a front end of the housing to control a concentration of unburned fuel contained in the exhaust gas flowing into the housing.

16 Claims, 6 Drawing Sheets

(51) Int. Cl.
| | |
|---|---|
| *B01J 23/44* | (2006.01) |
| *B01J 23/46* | (2006.01) |
| *B01J 35/00* | (2006.01) |
| *F01N 3/08* | (2006.01) |
| *F01N 3/10* | (2006.01) |
| *F02D 41/02* | (2006.01) |
| *F01N 13/00* | (2010.01) |
| *F01N 11/00* | (2006.01) |

(52) U.S. Cl.
CPC ............. *B01J 23/44* (2013.01); *B01J 23/464* (2013.01); *B01J 35/0006* (2013.01); *F01N 3/0814* (2013.01); *F01N 3/0842* (2013.01); *F01N 3/101* (2013.01); *F01N 11/00* (2013.01); *F01N 13/0093* (2014.06); *F02D 41/0275* (2013.01); *B01D 2255/1023* (2013.01); *B01D 2255/1025* (2013.01); *B01D 2255/2065* (2013.01); *F01N 2550/02* (2013.01); *F01N 2570/14* (2013.01); *F02D 2200/0816* (2013.01)

(58) Field of Classification Search
CPC ............. F01N 2570/14; F01N 2570/16; F01N 2900/08; F01N 2900/1602; F01N 2900/1624; F01N 3/0814; F01N 3/0842; F01N 3/0871; F01N 3/101; F01N 3/103; F01N 3/108; F01N 9/00; F02D 2200/0814; F02D 2200/0816; F02D 41/0295; F02D 41/1475
See application file for complete search history.

(56) References Cited

U.S. PATENT DOCUMENTS

2011/0162620 A1* 7/2011 Bidner .................. F02D 41/029
123/299
2012/0116655 A1* 5/2012 Bidner .................. F02D 41/029
701/104

\* cited by examiner

EXHAUST GAS PURIFICATION SYSTEM FOR VEHICLE AND METHOD OF CONTROLLING THE SAME

CROSS-REFERENCE TO RELATED APPLICATION

This application claims priority to and the benefit of Korean Patent Application No. 10-2019-0020389 filed in the Korean Intellectual Property Office on Feb. 21, 2019, the entire contents of which are incorporated herein by reference.

TECHNICAL FIELD

The present disclosure relates to an exhaust gas purification system for vehicle and a method of controlling the same. More particularly, the present disclosure relates to an exhaust gas purification system for vehicle reducing pollutants in exhaust gas and a method of controlling the same.

BACKGROUND

In general, to reduce carbon monoxide (CO), hydrocarbon (HC), particulate matter (PM), nitrogen oxide (NOx), etc. as a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean NOx Trap, LNT catalytic) device, etc.

However, applying these devices to gasoline engines leads to considerable cost increases and inconvenience of maintenance and repair of the vehicle such as charging of the elements. Further, in the high load region of the gasoline engine, the nitrogen oxide (NOx) purifying performance may be deteriorated due to a shortage of ammonia (NH3) production. Particularly, in a high load region of a lean burn gasoline engine, nitrogen oxide (NOx) purifying performance may be excessively lowered.

Recently, as a technique for eliminating such a problem and performing post-treatment of exhaust gas of a gasoline engine in accordance with the regulations of the environmentally friendly automobile, three-way catalytic converter (TWC) functioning to simultaneously remove carbon monoxide, nitrogen oxides, and hydrocarbons based on at least one catalyst of palladium (Pd), platinum (Pt), and rhodium (Rh)(mainly palladium or a combination of at least one of platinum and rhodium with palladium) has been developed and applied to the exhaust gas post-treatment system of gasoline engines.

However, the post-treatment of the exhaust gas using the three-way catalyst requires control to alternate the fuel lean and fuel rich conditions of the engine so as to oxidize carbon monoxide and hydrocarbons as well as reduce nitrogen oxides. When the engine is heated and the three-way catalyst is warmed up, the harmful components of exhaust gas including nitrogen oxides are removed to close to 100%, but there is a limit to removing nitrogen oxides in a cold state at the initial stage of engine startup. According to the experimental results, when the exhaust gas post-treatment apparatus using the existing three-way catalyst, in which the fuel lean and fuel rich conditions of the engine are periodically alternated, is evaluated according to the criteria of FTP-75, the urban driving mode prescribed by the US Environmental Protection Agency, in the cold state at the initial stage of the engine start, it was found that 60% or more of the total nitrogen oxides contained in the exhaust gas was exhausted through the tail pipe without being removed. Particularly, in order to satisfy the fuel efficiency regulation, which is one of the regulations on the environment friendliness of automobiles, a high efficiency engine applied to a vehicle is developed to lower the temperature of the exhaust gas, and a technology for purifying the exhaust gas at low temperature is further required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an exhaust gas purification system for vehicle and a method of controlling the same in which in the cold state, which is the initial stage of starting the engine and at the end of the NOx storage event at the fuel lean condition, the nitrogen oxides in the exhaust gas are effectively removed by switching to the normal operation mode in which the fuel lean and fuel rich conditions are alternately performed in consideration of the oxygen storage capacity (OSC) characteristic.

An exhaust gas purification system for vehicle provided on an exhaust pipe connected to an exhaust side of an engine for purifying an exhaust gas of the engine according to an exemplary embodiment of the present disclosure includes: a housing disposed on the exhaust pipe so as to receive the exhaust gas discharged from the engine and to exhaust the exhaust gas passed rearward; a front end catalyst disposed in the housing to primarily purify the exhaust gas flowing into the housing through a front end of the housing; a rear end catalyst disposed in the housing to secondarily purify the exhaust gas passing through the front end catalyst before the exhaust gas flows out to a rear end of the housing; and a controller connected to the exhaust pipe at a front end of the housing to control a concentration of unburned fuel contained in the exhaust gas flowing into the housing. Further, the controller performs lean control to control the concentration of the unburned fuel contained in the exhaust gas flowing into the housing to be fuel lean after the start of the engine, terminates the lean control at a set temperature corresponding to a maximum oxygen storage capacity (OSC) according to the degree of deterioration of the front end catalyst and the rear end catalyst, and performs normal control to control the concentration of the unburned fuel contained in the exhaust gas flowing into the housing such that a fuel lean condition and a fuel rich condition periodically alternately repeat.

The front end catalyst may be a palladium catalyst that oxidizes hydrocarbons and carbon monoxide and occludes nitrogen oxides.

The front end catalyst may be a Pd/CZO catalyst.

The rear end catalyst may be a rhodium catalyst for reducing nitrogen oxides.

The rear end catalyst may be a Rh/CZO catalyst.

The controller may control to terminate the lean control if the front end catalyst and the rear end catalyst are new products when the temperature of the exhaust gas flowing into the housing reaches 300° C. corresponding to a maximum oxygen storage capacity in case of new products.

The controller may control to terminate the lean control if the front end catalyst and the rear end catalyst are deteriorated products when the temperature of the exhaust gas flowing into the housing reaches 400° C. corresponding to a maximum oxygen storage capacity in case of deteriorated products.

The controller may control to perform oxygen purge on the front end catalyst and the rear end catalyst after the lean control ends, before performing the normal control.

The controller may perform the oxygen purge to control the oxygen saturation in the OSC material of the front end catalyst and the rear end catalyst to less than 40%.

The controller may control the oxygen purge to be performed for 3 seconds or more under the rich condition of the air-fuel ratio ($\lambda$) of 0.95 or less.

A method of controlling an exhaust gas purification system for vehicle, which includes a housing disposed on an exhaust pipe so as to receive an exhaust gas discharged from an engine and to exhaust the exhaust gas passed rearward, a front end catalyst primarily purifying the exhaust gas, a rear end catalyst secondarily purifying the exhaust gas passing through the front end catalyst, and a controller connected to the exhaust pipe at a front end of the housing to control a concentration of unburned fuel contained in the exhaust gas flowing into the housing according to another exemplary embodiment of the present disclosure includes: starting the engine; performing lean control to control the concentration of the unburned fuel contained in the exhaust gas flowing into the housing to be fuel lean; determining whether the front end catalyst and the rear end catalyst are new or deteriorated products; determining whether temperatures of the front end catalyst and the rear end catalyst, respectively, are equal to or higher than a first set temperature corresponding to a maximum oxygen storage capacity in case of new products if the front end catalyst and the rear end catalyst are new products; determining whether the temperatures of the front end catalyst and the rear end catalyst, respectively, are equal to or higher than a first set temperature if the front end catalyst and the rear end catalyst are new products; and performing normal control to control the concentration of the unburned fuel contained in the exhaust gas flowing into the housing such that a fuel lean condition and a fuel rich condition periodically alternately repeat.

The method may further include, after determining whether the front end catalyst and the rear end catalyst are new or deteriorated products: determining whether the temperatures of the front end catalyst and the rear end catalyst are equal to or higher than a second set temperature corresponding to a maximum oxygen storage capacity in case of deteriorated products if the front end catalyst and the rear end catalyst are deteriorated products; terminating the lean control if the temperatures of the front end catalyst and the rear end catalyst are equal to or higher than the second set temperature; and performing oxygen purge on the front end catalyst and the rear end catalyst.

The first set temperature may be 300° C.

The second set temperature may be 400° C.

The oxygen purge may be performed to control the oxygen saturation in the OSC material of the front end catalyst and the rear end catalyst to less than 40%.

The oxygen purge may be performed for 3 seconds or more under the rich condition of the air-fuel ratio ($\lambda$) of 0.95 or less.

According to an exemplary embodiment of the present disclosure, in the cold state, which is the initial stage of starting the engine and at the end of the NOx storage event at the fuel lean condition, the nitrogen oxides in the exhaust gas are effectively removed by switching to the normal operation mode in which the fuel lean and fuel rich conditions are alternately performed in consideration of the OSC characteristic.

DETAILED DESCRIPTION OF THE EMBODIMENTS

Figure 1:
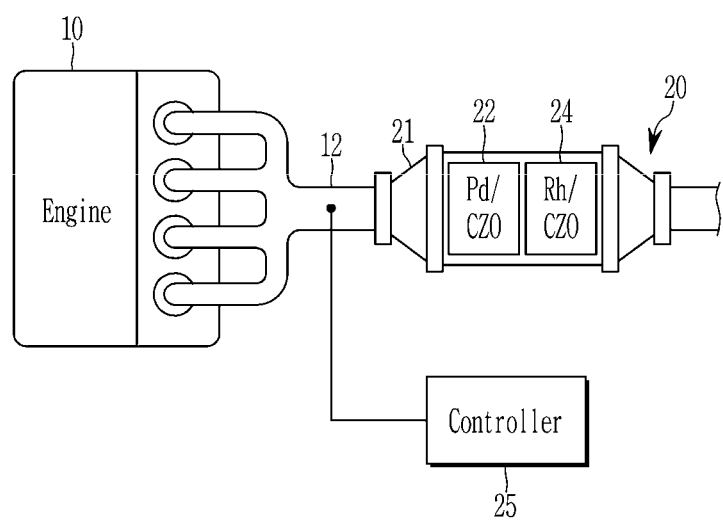
FIG. 1 is a schematic configuration diagram of an exhaust gas purification system for vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Further, to the same structure, element, or component appearing in more than one of the figures, the same reference numerals are used to denote similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Now, an exhaust gas purification system according to an exemplary embodiment of the present disclosure will be described with reference to FIG. 1.

FIG. 1 is a schematic configuration diagram of an exhaust gas purification system for vehicle according to an exemplary embodiment of the present disclosure.

Referring to FIG. 1, an exhaust gas purification system 20 for vehicle according to an exemplary embodiment of the present disclosure is provided on an exhaust pipe 12 connected to an exhaust side of an engine 10 for purifying an exhaust gas of the engine 10, and includes a housing 21 disposed on the exhaust pipe 12, a front end catalyst 22 and a rear end catalyst 24 incorporated in the housing 21, and a controller 25 to control the concentration of unburned fuel contained in the exhaust gas flowing into the housing 21. In FIG. 1, a part of the housing 21 is cut to show the configuration of the front end catalyst 22 and the rear end catalyst 24.

The engine 10 burns air/fuel mixture in which fuel and air are mixed so as to convert chemical energy into mechanical energy. The engine 10 includes a plurality of combustion chambers for generating a driving force by combustion of fuel, and is connected to an intake manifold so as to receive the air in a combustion chamber, and is connected to an exhaust manifold such that exhaust gas generated in combustion process is gathered in the exhaust manifold and is exhausted to the exterior. An injector is mounted in the combustion chamber so as to inject the fuel into the combustion chamber.

The exhaust pipe 12 is connected to the exhaust side of the engine 10 to exhaust the exhaust gas discharged from the engine 10 to the outside. The exhaust pipe 12 may extend rearward along the under floor of the vehicle to exhaust the exhaust gas to the rear of the vehicle, and the arrangement of the exhaust pipe 12 and the connection with the exhaust side of the engine 10 will be apparent to those skilled in the art (hereinafter, those skilled in the art), so that detailed description thereof will be omitted.

The exhaust gas discharged from the engine 10 passes through the exhaust pipe 12 and passes through the exhaust gas purification system 20. Further, the exhaust gas passing through the exhaust gas purification system 20 passes through the front end catalyst 22 and the rear end catalyst 24 in sequence. That is, the front end of the housing 21 is connected to the engine 10 by the exhaust pipe 12 so as to receive the exhaust gas discharged from the engine 10, and the rear end of the housing 21 is connected to the exhaust gas purification system 20 so as to discharge the exhaust gas passed through the exhaust pipe 12 rearward of the vehicle. Here, the front end and the rear end of the component refer to the flow of the exhaust gas, and the exhaust gas is defined as flowing from the front end to the rear end of the component.

The front end catalyst 22 functions to primarily purify the exhaust gas flowing into the housing 21 through the front end of the housing 21. Further, the front end catalyst may be a palladium (Pd) catalyst that oxidizes hydrocarbons (HC) and carbon monoxide (CO) and occludes nitrogen oxides (NOx). More particularly, the front end catalyst may be a Pd/CZO catalyst in the palladium (Pd) catalyst.

The rear end catalyst 24 functions to secondarily purify the exhaust gas passing through the front end catalyst 22 before the exhaust gas flows out to the rear end of the housing 21. Further, the rear end catalyst 24 may be a rhodium (Rh) catalyst for reducing nitrogen oxides. More particularly, the rear end catalyst may be an Rh/CZO catalyst in the rhodium (Rh) catalyst.

The controller 25 is connected to the exhaust pipe 12 at the front end of the housing 21 to control the concentration of the unburned fuel contained in the exhaust gas flowing into the housing 21.

The controller 25 detects the temperature of the exhaust gas flowing through the exhaust pipe 12 connected to the front end of the housing 21 through the temperature sensor connected to the controller 25, and collects information of the air-fuel ratio ($\lambda$) by the oxygen sensor connected to the controller 25.

The controller 25 may perform the lean control so that the concentration of the unburned fuel contained in the exhaust gas flowing into the housing after starting the engine becomes fuel lean. Here, the lean control can be performed under the condition that the air-fuel ratio ($\lambda$) is about 1.05.

The controller 25 terminates the lean control at a set temperature according to the degree of deterioration of the front end catalyst 22 and the rear end catalyst 24. The lean control proceeds to a temperature at which the front end catalyst 22 and the rear end catalyst 24 are activated, and the activated temperature is lower for new products with lower degrees of deterioration of the front end catalyst 22 and the rear end catalyst 24 and the higher the activation temperature is for an older product (deteriorated product) having a higher degree of deterioration of the front end catalyst 22 and the rear end catalyst 24. If the temperature of the exhaust gas flowing into the housing 21 reaches about 300° C. which is the activation temperature (set temperature) corresponding to a maximum oxygen storage capacity in case of new products, the controller 25 terminates the lean control if the front end catalyst 22 and the rear end catalyst 24 are new ones. Further, the controller 25 terminates the lean control when the temperature of the exhaust gas flowing into the housing 21 reaches the activation temperature (set temperature) of about 400° C. corresponding to a maximum oxygen storage capacity in case of deteriorated products if the front end catalyst 22 and the rear end catalyst 24 are deteriorated products.

The controller 25 performs normal control to control the concentration of the unburned fuel contained in the exhaust gas flowing into the housing 21 such that the fuel lean and the fuel rich periodically repeat the regular alternation after termination of lean control.

The controller 25 controls the oxygen purge to be performed before performing the normal control if the front end catalyst 22 and the rear end catalyst 24 are degraded products. When the front end catalyst 22 and the rear end catalyst 24 are new, no separate oxygen purge is required since the catalysts 22 and 24 are activated and nitrogen oxides (NOx) can be desorbed and reduced before an oxygen storage capacity (OSC) material of the catalysts 22 and 24 is saturated with oxygen. However, when the front end catalyst 22 and the rear end catalyst 24 are deteriorated products, at a temperature at which the catalysts 22 and 24 are activated, the OSC material of the catalysts 22 and 24 is saturated with oxygen, and nitrogen oxides (NOx) are difficult to desorb and reduce. Therefore, when the catalysts 22 and 24 are deteriorated products, the controller 25 performs oxygen purge first before performing the normal control to control the oxygen saturation in the OSC material of the catalyst 22 and 24 to be less than about 40%. The oxygen purge may be performed for about 3 seconds or more under the rich condition of the air-fuel ratio (λ) of about 0.95 or less.

Figure 2:
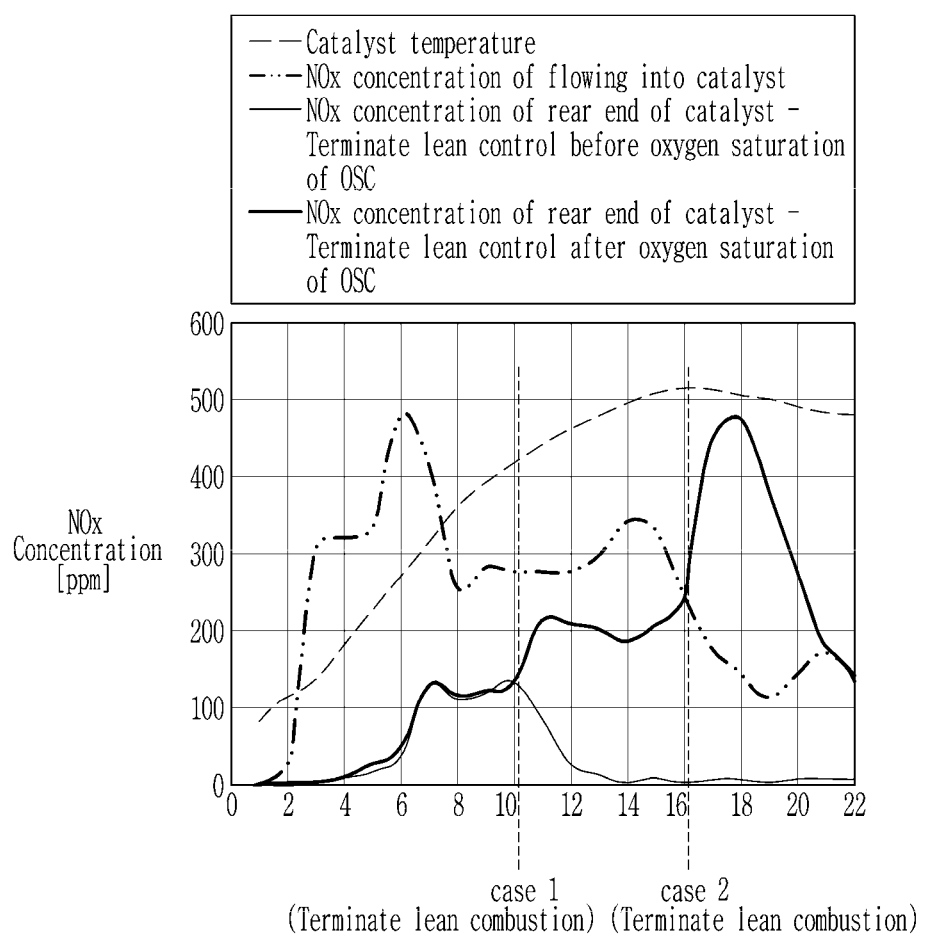
FIG. 2 is a graph showing nitrogen storage performance where the exhaust gas purification system for a vehicle according to an exemplary embodiment of the present disclosure performs lean control in a cold state of the engine and terminates lean control before and after oxygen saturation of an oxygen storage capacity (OSC) material of a catalyst.
Figure 3:
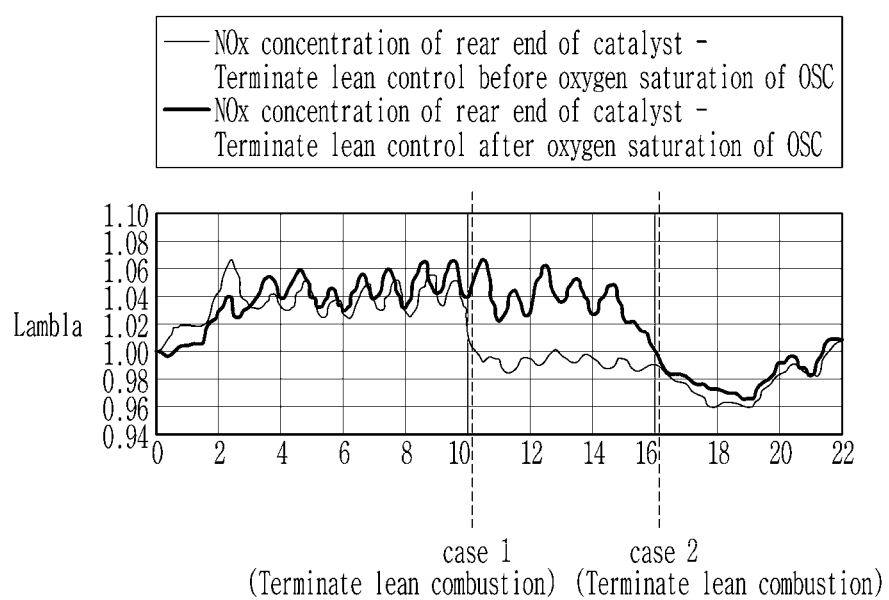
FIG. 3 is a graph showing a change of air-fuel ratio ($\lambda$) in each case where the exhaust gas purification system for a vehicle according to an exemplary embodiment of the present disclosure performs lean control in the cold state of the engine and terminates lean control before and after oxygen saturation of the OSC material of the catalyst.

FIG. 2 is a graph showing nitrogen storage performance in the case where the exhaust gas purification system for a vehicle according to an exemplary embodiment of the present disclosure performs lean control in the cold state of the engine and terminates lean control before and after oxygen saturation of the OSC material of the catalyst, and FIG. 3 is a graph showing the change of air-fuel ratio (λ) in each case where the exhaust gas purification system for a vehicle according to an exemplary embodiment of the present disclosure performs lean control in the cold state of the engine and terminates lean control before and after oxygen saturation of the OSC material of the catalyst.

In the graph shown in FIG. 2, the vertical axis represents the concentration of nitrogen oxides (NOx) contained in the exhaust gas, and the horizontal axis represents time. That is, the graph shows the concentration of nitrogen oxides (NOx) contained in the exhaust gas according to the passage of time in the initial cold state after the start of the engine 10. In the graph, a catalyst temperature rise curve along with the passage of time in the initial cold state after the start of the engine 10 is shown together with a two-dot chain line, and The change in the concentration of nitrogen oxides (NOx) contained in the exhaust gas flowing out of the housing 21 is shown by thick and thin solid lines, respectively when the lean control before and after the oxygen saturation in the OSC material of the catalysts 22 and 24 is terminated (case 1, case 2).

In the graph shown in FIG. 3, the vertical axis represents the air-fuel ratio (λ) and the horizontal axis represents time. That is, FIG. 3 shows the change of air-fuel ratio (λ) of the case where the lean control is terminated (case 1, case 2) before and after oxygen in the OSC material of the catalysts 22 and 24 and performs normal control along with time flow in the initial cold state after the start of the engine 10.

As shown in FIG. 2, when the temperature of the catalysts 22 and 24 is raised after the lean burn has progressed and the lean control has terminated (case 1) before the oxygen in the OSC material of the catalysts 22 and 24 is saturated, since the nitrogen oxide (NOx) can be desorbed and reduced, the nitrogen oxide (NOx) purifying performance is excellent. However, when the oxygen in the OSC material of the catalyst 22 and 24 is saturated and the lean control is terminated (case 2), since nitrogen oxides (NOx) are difficult to desorb and reduce, the performance of nitrogen oxide (NOx) purification is not very good.

Figure 4:
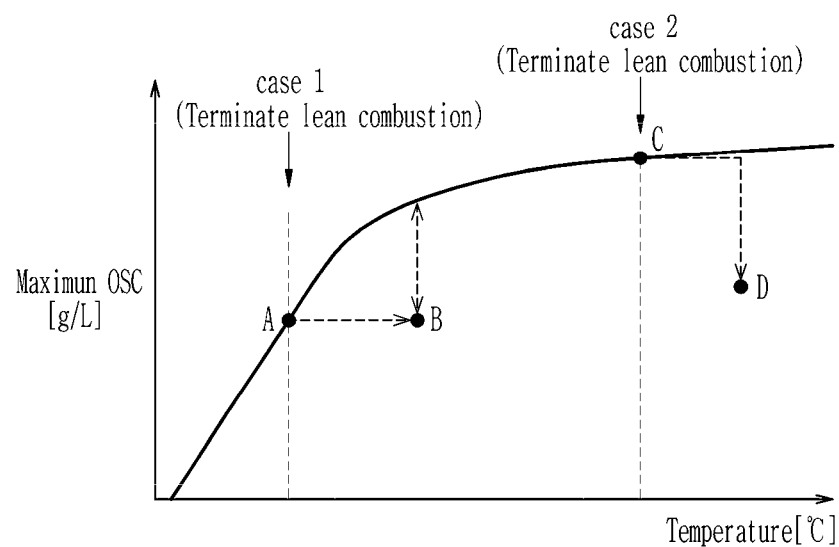
FIG. 4 is a graph showing the oxygen saturation of the OSC material of the catalyst in each case where the lean control according to the degree of deterioration of the catalyst is completed in the cold state of the engine of the exhaust gas purification system for a vehicle according to an exemplary embodiment of the present disclosure.
Figure 5:
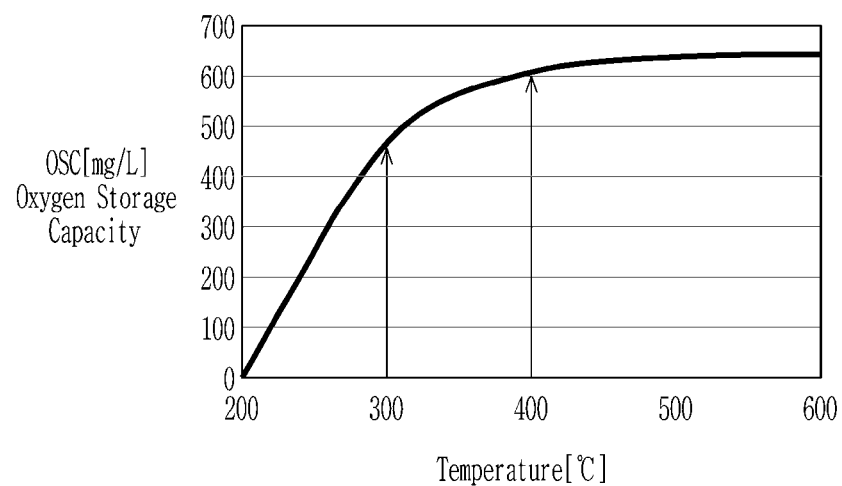
FIG. 5 is a graph showing the lean control termination temperature in each case according to the degree of deterioration of the catalyst in the cold state of the engine of the exhaust gas purification system for a vehicle according to an exemplary embodiment of the present disclosure.

FIG. 4 is a graph showing the oxygen saturation of the OSC material of the catalyst in each case where the lean control according to the degree of deterioration of the catalyst is completed in the cold state of the engine of the exhaust gas purification system for a vehicle according to an exemplary embodiment of the present disclosure, and FIG. 5 is a graph showing the lean control termination temperature in each case according to the degree of deterioration of the catalyst in the cold state of the engine of the exhaust gas purification system for a vehicle according to an exemplary embodiment of the present disclosure.

Referring to FIG. 4 and FIG. 5, when the catalysts 22 and 24 are new products having a low degree of deterioration, the catalyst activation temperature corresponding to a maximum oxygen storage capacity is about 300° C., and the lean burn is terminated at point A (case 1). Then, after the temperature rises, the oxygen storage capacity in the OSC material of the catalysts 22 and 24 becomes the capacity corresponding to the point B, which is different from the maximum oxygen storage capacity. Therefore, in this case, the nitrogen oxide (NOx) desorbing performance can be maintained high even after proceeding to normal combustion immediately after completion of the lean burn without the need for oxygen purging of the catalysts 22 and 24 separately.

However, when the catalysts 22 and 24 are old product (deteriorated products) having high degree of deterioration, the catalyst activation temperature corresponding to a maximum oxygen storage capacity is about 400° C., and the lean burn is terminated at the point C (case 2). Then, after the temperature rises, the oxygen storage capacity in the OSC material is not significantly different from the maximum oxygen storage capacity, so that the oxygen saturation is very high. Therefore, in this case, it is necessary to lower oxygen saturation to the point D through oxygen purging separately. At this time, the oxygen saturation in the OSC material of the catalysts 22 and 24 may be reduced to about 40% or less and the oxygen purge may be performed for about 3 seconds or more under the rich condition of about 0.95 or less. After the oxygen purge is terminated, the normal combustion is advanced to maintain the nitrogen oxide (NOx) desorption performance high.

Figure 6:
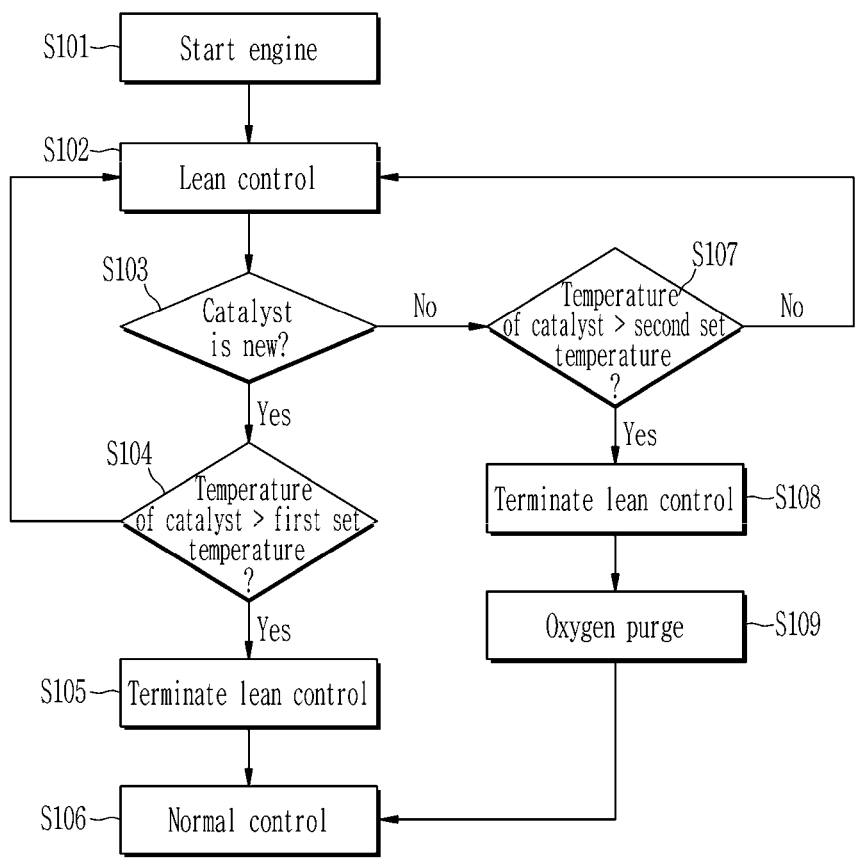
FIG. 6 is a flowchart illustrating a method of controlling an exhaust gas purification system for a vehicle according to an exemplary embodiment of the present disclosure.

FIG. 6 is a flowchart illustrating a method of controlling an exhaust gas purification system for a vehicle according to an exemplary embodiment of the present disclosure.

Referring to FIG. 6, in a method of controlling an exhaust gas purification system for vehicle according to an exemplary embodiment of the present disclosure, the exhaust gas purification system for vehicle includes a housing 21 disposed on the exhaust pipe 12 so as to receive the exhaust gas discharged from the engine 10 and to exhaust the exhaust gas passed rearward, a front end catalyst 22 primarily purifying the exhaust gas, a rear end catalyst 24 secondarily purifying the exhaust gas passing through the front end catalyst 22, and a controller 25 connected to the exhaust pipe 12 at a front end of the housing 21 to control the concentration of unburned fuel contained in the exhaust gas flowing into the housing 21. The method firstly includes starting the engine 10 S101. Then, simultaneously with or immediately after the start of the engine 10, lean control is performed to control the concentration of the unburned fuel contained in the exhaust gas flowing into the housing 21 to be fuel lean by the controller 25 S102. Here, the lean control may be such that the minimum air-fuel ratio lambda is maintained at 1.03 or more, and the air-fuel ratio lambda may be maintained at about 1.05.

While the lean control is being performed, whether the front end catalyst 22 and the rear end catalyst 24 are new or deteriorated products is determined S103.

Then, if the front end catalyst 22 and the rear end catalyst 24 are new products whether the temperatures of the front end catalyst 22 and the rear end catalyst 24 are equal to or higher than a first set temperature is determined S104. At this time, the first set temperature is 300° C. which is a catalyst activation temperature.

Then, the lean control is terminated if the temperatures of the front end catalyst 22 and the rear end catalyst 24 are equal to or higher than the first set temperature S105, and normal control is performed to control the concentration of the unburned fuel contained in the exhaust gas flowing into the housing 21 such that the fuel lean and the fuel rich periodically repeat the regular alternation S106.

After determining whether the front end catalyst 22 and the rear end catalyst 24 are new or deteriorated products S103, whether the temperatures of the front end catalyst 22 and the rear end catalyst 24 are equal to or higher than a second set temperature is determined if the front end catalyst 22 and the rear end catalyst 24 are deteriorated products S107. At this time, the second set temperature may be about 400° C. which is a catalyst activation temperature.

Then, the lean control is terminated if the temperatures of the front end catalyst 22 and the rear end catalyst 24 are equal to or higher than the second set temperature S108, and oxygen purge is performed on the front end catalyst 22 and the rear end catalyst 24 S109. At this time, the oxygen purge may be performed to control the oxygen saturation in the OSC material of the front end catalyst 22 and the rear end catalyst 24 to less than about 40%, and performed for 3 seconds or more under the rich condition of the air-fuel ratio ($\lambda$) of about 0.95 or less. Then, normal control is performed to control the concentration of the unburned fuel contained in the exhaust gas flowing into the housing 21 such that the fuel lean and the fuel rich periodically repeat the regular alternation S106.

According to an exemplary embodiment of the present disclosure, in the cold state, which is the initial stage of starting the engine and at the end of the NOx storage event at the fuel lean condition, the nitrogen oxides in the exhaust gas are effectively removed by switching to the normal operation mode in which the fuel lean and fuel rich conditions are alternately performed in consideration of the OSC characteristic.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An exhaust gas purification system for a vehicle disposed on an exhaust pipe that is connected to an exhaust side of an engine for purifying an exhaust gas of the engine, the system comprising:
    a housing disposed on the exhaust pipe so as to receive the exhaust gas discharged from the engine and to exhaust the exhaust gas passed rearward;
    a front end catalyst disposed in the housing to primarily purify the exhaust gas flowing into the housing through a front end of the housing;
    a rear end catalyst disposed in the housing to secondarily purify the exhaust gas passing through the front end catalyst before the exhaust gas flows out to a rear end of the housing; and
    a controller connected to the exhaust pipe at a front end of the housing to control a concentration of unburned fuel contained in the exhaust gas flowing into the housing,
    wherein the controller is configured to:
        perform lean control to control the concentration of the unburned fuel contained in the exhaust gas flowing into the housing to be fuel lean after the engine starts,
        terminate the lean control at a set temperature corresponding to a maximum oxygen storage capacity (OSC) according to a degree of deterioration of the front end catalyst and the rear end catalyst, and
        perform normal control to control the concentration of the unburned fuel contained in the exhaust gas flowing into the housing such that a fuel lean condition and the fuel rich condition periodically alternately repeated.

2. The system of claim 1, wherein the front end catalyst is a palladium catalyst that oxidizes hydrocarbons and carbon monoxide and occludes nitrogen oxides.

3. The system of claim 2, wherein the front end catalyst is a Pd/CZO catalyst.

4. The system of claim 1, wherein the rear end catalyst is a rhodium catalyst for reducing nitrogen oxides.

5. The system of claim 4, wherein the rear end catalyst is an Rh/CZO catalyst.

6. The system of claim 1, wherein the controller terminates the lean control if the front end catalyst and the rear end catalyst are new products when a temperature of the exhaust gas flowing into the housing reaches 300° C. corresponding to a maximum oxygen storage capacity in case of new products.

7. The system of claim 1, wherein the controller terminates the lean control if the front end catalyst and the rear end catalyst are deteriorated products when the temperature of the exhaust gas flowing into the housing reaches 400° C. corresponding to a maximum oxygen storage capacity in case of deteriorated products.

8. The system of claim 7, wherein the controller performs oxygen purge on the front end catalyst and the rear end catalyst after the lean control ends, before performing the normal control.

9. The system of claim 8, wherein the controller performs the oxygen purge to control the oxygen saturation in the OSC material of the front end catalyst and the rear end catalyst to less than 40%.

10. The system of claim 8, wherein the controller performs the oxygen purge for 3 seconds or more under the fuel rich condition of air-fuel ratio of 0.95 or less.

11. A method of controlling an exhaust gas purification system for a vehicle, which includes a housing disposed on an exhaust pipe so as to receive an exhaust gas discharged from an engine and to exhaust the exhaust gas passed rearward, a front end catalyst primarily purifying the exhaust gas, a rear end catalyst secondarily purifying the exhaust gas passing through the front end catalyst, and a controller connected to the exhaust pipe at a front end of the housing to control a concentration of unburned fuel contained in the exhaust gas flowing into the housing, the method comprising:
    starting the engine;
    performing lean control to control the concentration of the unburned fuel contained in the exhaust gas flowing into the housing to be fuel lean;
    determining whether the front end catalyst and the rear end catalyst are new or deteriorated products;
    determining whether temperatures of the front end catalyst and the rear end catalyst, respectively, are equal to or higher than a first set temperature corresponding to a maximum oxygen storage capacity in case of new products if the front end catalyst and the rear end catalyst are new products;
    terminating the lean control when the temperatures of the front end catalyst and the rear end catalyst, respectively, are equal to or higher than the first set temperature; and
    performing normal control to control the concentration of the unburned fuel contained in the exhaust gas flowing into the housing such that a fuel lean condition and a fuel rich condition periodically alternately repeat.

12. The method of claim 11, further comprising, after determining whether the front end catalyst and the rear end catalyst are new or deteriorated products:

determining whether the temperatures of the front end catalyst and the rear end catalyst, respectively, are equal to or higher than a second set temperature corresponding to a maximum oxygen storage capacity in case of deteriorated products when the front end catalyst and the rear end catalyst are deteriorated products;

terminating the lean control when the temperatures of the front end catalyst and the rear end catalyst, respectively, are equal to or higher than the second set temperature; and performing oxygen purge on the front end catalyst and the rear end catalyst.

13. The method of claim 11, wherein the first set temperature is 300° C.

14. The method of claim 12, wherein the second set temperature is 400° C.

15. The method of claim 14, wherein the oxygen purge is performed to control an oxygen saturation in an oxygen storage capacity material of the front end catalyst and the rear end catalyst to less than 40%.

16. The method of claim 14, wherein the oxygen purge is performed for 3 seconds or more under the fuel rich condition of air-fuel ratio of 0.95 or less.

* * * * *